(12) United States Patent
Ueda

(10) Patent No.: US 10,740,907 B2
(45) Date of Patent: Aug. 11, 2020

(54) MOVING BODY TRACKING METHOD, MOVING BODY TRACKING DEVICE, AND PROGRAM

(71) Applicant: PANASONIC INTELLECTUAL PROPERTY MANAGEMENT CO., LTD., Osaka (JP)

(72) Inventor: Junko Ueda, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 154 days.

(21) Appl. No.: 15/774,438

(22) PCT Filed: Oct. 14, 2016

(86) PCT No.: PCT/JP2016/004578
§ 371 (c)(1),
(2) Date: May 8, 2018

(87) PCT Pub. No.: WO2017/081839
PCT Pub. Date: May 18, 2017

(65) Prior Publication Data
US 2018/0322641 A1    Nov. 8, 2018

(30) Foreign Application Priority Data

Nov. 13, 2015 (JP) ................................ 2015-223055

(51) Int. Cl.
*G06T 7/246* (2017.01)
*H04N 7/18* (2006.01)
(Continued)

(52) U.S. Cl.
CPC .......... *G06T 7/246* (2017.01); *A63B 24/0021* (2013.01); *G06T 7/194* (2017.01);
(Continued)

(58) Field of Classification Search
CPC .......... G06T 7/246; G06T 7/248; G06T 7/251
See application file for complete search history.

(56) References Cited

U.S. PATENT DOCUMENTS 10,002,289 B2 *  6/2018  Ueda ......................... G06T 7/20
2005/0226508 A1 * 10/2005  Gotohda ............ G06K 9/00362
382/190
(Continued)

FOREIGN PATENT DOCUMENTS

EP   2189944       5/2010
JP   2004-046647   2/2004
(Continued)

OTHER PUBLICATIONS

Chakraborty et al., "Real-time position estimation and tracking of a basketball", 2012 IEEE International Conference on Signal Processing, Computing and Control, Mar. 15-17, 2012, pp. 1-6 (Year: 2012).*

(Continued)

*Primary Examiner* — Nay A Maung
*Assistant Examiner* — Jose M Torres
(74) *Attorney, Agent, or Firm* — Greenblum & Bernstein, P.L.C.

(57) ABSTRACT

In a case in which the size of a moving body changes by a position of the moving body, in order to accurately track the moving body without an effort of the user regardless of a change in the size, the present disclosure estimates a size of the moving body in each of the images of the frames, updates template data based on the estimated size of the moving body, and compares a candidate region that is a candidate of a region where the moving body is present in each of the images of the frames with the template data, and determines whether or not the moving body is positioned in the candidate region based on the comparison result.

19 Claims, 12 Drawing Sheets

(51) Int. Cl.
*G06T 7/194* (2017.01)
*A63B 24/00* (2006.01)

(52) U.S. Cl.
CPC ............... *G06T 7/248* (2017.01); *H04N 7/18* (2013.01); *A63B 2024/0031* (2013.01); *G06T 2207/10016* (2013.01); *G06T 2207/30224* (2013.01); *G06T 2207/30241* (2013.01)

(56) References Cited

U.S. PATENT DOCUMENTS

| | | | |
|---|---|---|---|
| 2005/0232467 | A1 | 10/2005 | Mohri et al. |
| 2007/0183629 | A1* | 8/2007 | Porikli ..................... G06K 9/32 382/103 |
| 2009/0028440 | A1* | 1/2009 | Elangovan ........... G06K 9/6202 382/216 |
| 2010/0165113 | A1 | 7/2010 | Abe |
| 2010/0177194 | A1 | 7/2010 | Huang et al. |
| 2010/0226532 | A1* | 9/2010 | Hayasaka ............ G06K 9/6203 382/103 |
| 2010/0296697 | A1* | 11/2010 | Ikenoue ................... H04N 7/18 382/103 |
| 2012/0020518 | A1* | 1/2012 | Taguchi .................. G06T 7/292 382/103 |
| 2013/0163830 | A1 | 6/2013 | Matsushita |
| 2014/0341430 | A1 | 11/2014 | Ryu |
| 2015/0178568 | A1 | 6/2015 | Shellshear |
| 2015/0215546 | A1 | 7/2015 | Adachi |
| 2017/0132470 | A1* | 5/2017 | Sasaki ................ G06K 9/00724 |

FOREIGN PATENT DOCUMENTS

| | | |
|---|---|---|
| JP | 2004-157850 | 6/2004 |
| JP | 2010-198166 | 9/2010 |
| JP | 2013-149242 | 8/2013 |
| JP | 2014-127154 | 7/2014 |
| JP | 2014-149716 | 8/2014 |
| JP | 2015-501614 | 1/2015 |
| JP | 2015-070503 | 4/2015 |
| JP | 2015-142181 | 8/2015 |
| WO | 2008/114683 | 9/2008 |
| WO | 2009/034709 | 3/2009 |

OTHER PUBLICATIONS

Takahashi et al., "Real-Time Ball Position Measurement for Football Games Based on Ball's Appearance and Motion Features", 2015 11th International Conference on Signal-Image Technology & Internet-Based Systems (SITIS), Nov. 23-27, 2015, pp. 287-294 (Year: 2015).*

Yu et al., "A ball tracking framework for broadcast soccer video", Proceedings 2003 International Conference on Multimedia and Expo. ICME '03, Jul. 6-9, 2003, pp. II-273-II-276 (Year: 2003).*

The Extended European Search Report dated Aug. 17, 2018 for the related European Patent Application No. 16863806.2.

Lian Liu et al: "Mean-Shift Tracking Algorithm with Adaptive Kernel-Bandwidth of Target", IEEE Conference Anthology, IEEE, Jan. 1, 2013 (Jan. 1, 2013), pp. 1-4, XP032585169.

Chakraborty Bodhisattwa et al: "A real-time trajectory-based ball detection-and-tracking framework for basketball video", Journal of Optics, Springer India, India, vol. 42, No. 2, Jan. 10, 2013 (Jan. 10, 2013), pp. 156-170, XP035358383.

International Search Report issued in International Patent Application No. PCT/JP2016/004578, dated Jan. 10, 2017.

* cited by examiner

FIG. 6

| BALL SIZE GROUP ID | BALL SIZE GROUP | MINIMUM SIZE (PIXEL) | MAXIMUM SIZE (PIXEL) |
|---|---|---|---|
| G01 | SMALL | 6 | 12 |
| G02 | MEDIUM | 13 | 24 |
| G03 | LARGE | 25 | 48 |

FIG. 7

| BALL SIZE GROUP ID | BALL WIDTH CHANGE AMOUNT (PIXEL) | BALL HEIGHT CHANGE AMOUNT (PIXEL) | MOVEMENT DISTANCE (PIXEL) | TRACKING THRESHOLD VALUE | DETECTION THRESHOLD VALUE |
|---|---|---|---|---|---|
| G01 | 4 | 4 | 16 | 0.7 | 0.6 |
| G02 | 8 | 8 | 64 | 0.8 | 0.65 |
| G03 | 12 | 12 | 128 | 0.8 | 0.5 |

MOVING BODY TRACKING METHOD, MOVING BODY TRACKING DEVICE, AND PROGRAM

TECHNICAL FIELD

The present disclosure relates to a moving body tracking method, a moving body tracking device, and a program for tracking a position of a moving body such as a ball in a sports image obtained by capturing a sports game.

BACKGROUND ART

In the related art, a moving body tracking device that tracks a moving body in an image is known. For example, according to a technique disclosed in PTL 1, a prediction position of a moving body in a current frame is obtained based on position information of the moving body in a past frame. In addition, a candidate object having a predetermined unique characteristic in the moving body is extracted from image data in the current frame, and a candidate object closer to the prediction position among the extracted candidate objects is specified as the moving body.

CITATION LIST

Patent Literature

PTL 1: Japanese Patent Unexamined Publication No. 2004-046647

SUMMARY OF THE INVENTION

However, according to the above described technique disclosed in PTL 1, there is a problem that in a case in which the size of the moving body changes, it is impossible to cope with the change and the moving body becomes out of sight. For example, in a sports game where a ball is used as a moving body, such as soccer, a camera which is able to capture the entire field of the game at once has been developed. In an image captured by such a camera, there is a clear difference between the size of the ball of a case in which the ball is positioned on the back side of the field and the size of the ball of a case in which the ball is positioned on the front side of the field. In such a case, according to the technique disclosed in PTL 1, even in the same moving body (ball), the moving body does not always have the same feature due to the difference between the case in which the moving body is positioned on the back side of the field and the case in which the moving body is positioned on the front side, and the detection accuracy maybe reduced.

In order to improve the detection accuracy, for example, the user may sequentially and manually set the feature amount for extracting a candidate object according to the size of the ball. However, in this case, the user is required to always monitor whether or not a change in the size of the ball occurs, and it is necessary to perform an operation for changing the feature amount whenever the size changes. Thus, the burden of the user is very large.

An object of the present disclosure is to provide a moving body tracking method, a moving body tracking device, and a program capable of accurately tracking a moving body without an effort of the user regardless of a change in the size, in a case in which the size of the moving body changes by the position of the moving body.

According to the present disclosure, there is provided a moving body tracking method of tracking a position of a moving body in each of images of a plurality of frames configuring a sports image obtained by capturing a game of a sports. The moving body tracking method includes estimating a size of the moving body in each of the images of the frames, updating template data based on the estimated size of the moving body, and comparing a candidate region that is a candidate of a region where the moving body is present in each of the images of the frames with the template data and determining whether or not the moving body is positioned in the candidate region based on the comparison result.

According to the present disclosure, there is provided a moving body tracking device for tracking a position of a moving body in each of images of a plurality of frames configuring a sports image obtained by capturing a game of a sports. The size of the moving body in each of the images of the frames is estimated. Template data based on the estimated size of the moving body is updated. A candidate region that is a candidate of a region where the moving body is present in each of the images of the frames is compared with the template data, and it is determined whether or not the moving body is positioned in the candidate region based on the comparison result.

According to the present disclosure, there is provided a program which causes a processor to sequentially execute a process of tracking a position of a moving body in each of images of a plurality of frames configuring a sports image obtained by capturing a game of a sports. The process includes estimating the size of the moving body in each of the images of the frames, updating template data based on the estimated size of the moving body, and comparing a candidate region that is a candidate of a region where the moving body is present in each of the images of the frames with the template data, and determining whether or not the moving body is positioned in the candidate region based on the comparison result.

According to the present disclosure, it is possible to accurately track a moving body without an effort of the user regardless of a change in the size, in a case in which the size of the moving body changes by the position of the moving body.

BRIEF DESCRIPTION OF DRAWINGS

FIG. 6 is a diagram for describing a method of dividing a ball size group.

FIG. 7 is a diagram for describing a method of acquiring a parameter corresponding to the ball size group.

DESCRIPTION OF EMBODIMENTS

Figure 1:
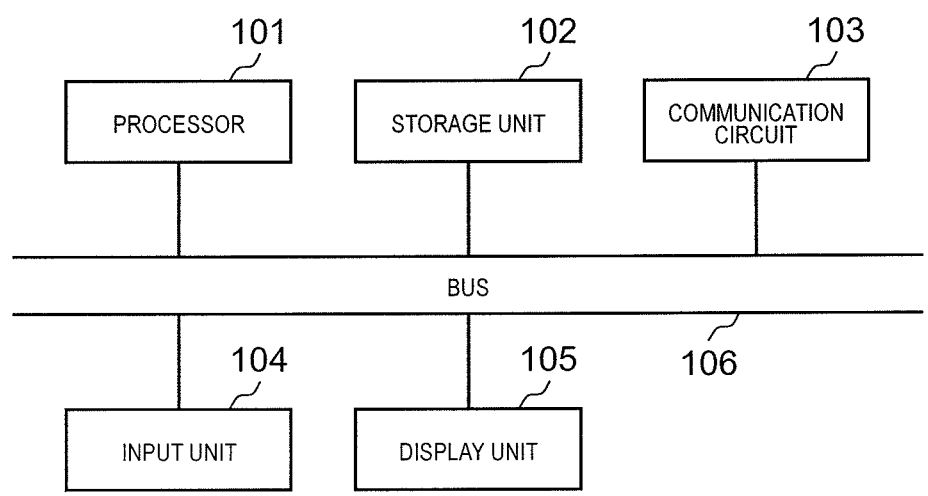
FIG. 1 is a diagram illustrating an example of a configuration of a moving body tracking device according to an exemplary embodiment of the disclosure.

Hereinafter, each embodiment of the present disclosure will be described in detail with reference to the drawings. FIG. 1 is a diagram illustrating an example of a configuration of moving body tracking device 100 according to an exemplary embodiment of the disclosure. Moving body tracking device 100 is a device that acquires an image captured by an external camera or the like which is not shown and tracks a moving body in the acquired image. In the present exemplary embodiment, an example in which moving body tracking device 100 tracks a ball or the like, which is used in a game of a soccer, as a moving body in a sports image obtained by capturing the game of the soccer which is one of a sports game is described. In addition, the sports image means an image obtained by recording the game of the sports.

Moving body tracking device 100 includes processor 101 such as a Central Processing Unit (CPU), storage unit 102 which includes a work memory such as a Read Only Memory (ROM) or a Random Access Memory (RAM) storing a control program, a Hard Disk Drive (HDD) storing image data and the like, and the like, communication circuit 103 which performs with an external camera or the like, input unit 104 which receives an input of the user, such as a mouse or a trackball, display unit 105 which displays an image and the like, such as a liquid crystal display, and bus 106 which connects such configurations to each other and functioned as a route for performing data communication between the configurations. An operation of moving body tracking device 100 which will be described later is realized by moving body tracking device 100 executing the control program read from storage unit 102 by processor 101.

Figure 2:
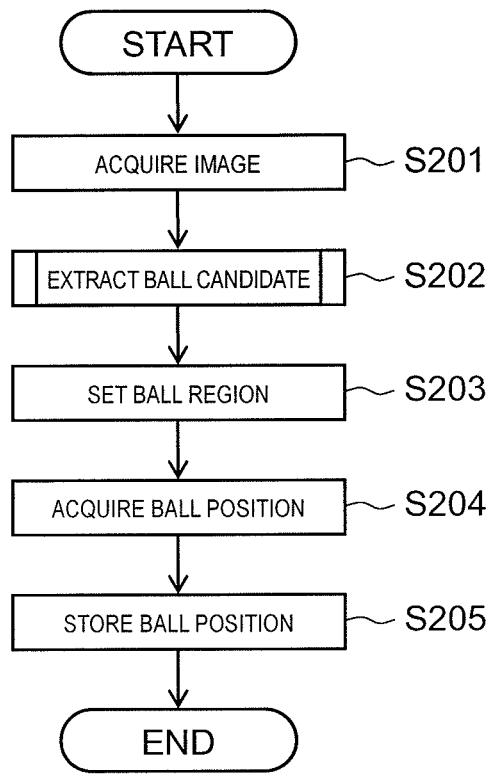
FIG. 2 is a flowchart illustrating an example of an operation of the moving body tracking device with respect to an image of a first frame.

Next, the operation of moving body tracking device 100 is described with reference to FIG. 2. FIG. 2 is a flowchart illustrating an example of the operation of moving body tracking device 100 with respect to an image of a first frame. Here, the image of the first frame means, for example, in addition to a head frame of the image, an image of a frame of the image acquired firstly after moving body tracking device 100 is restarted, or an image of a frame next to a frame where the ball is lost in a case in which moving body tracking device 100 failed (lost) tracking and detected the ball, or an image of a frame where the user of moving body tracking device 100 instructed that the ball position is wrong.

In step S201, processor 101 acquires the image captured by the external camera or the like via communication circuit 103. Here, the image is a so-called a moving image configured of images of a plurality of frames. Since the image is an image acquired by capturing the game of the sports such as soccer as described above, the ball is captured in many of the frames configuring the image. The image captured by the external camera or the like may be directly acquired from the camera by processor 101 via communication circuit 103, or the image transmitted via communication circuit 103 may be stored in, for example, storage unit 102 and the image stored in storage unit 102 may be read whenever the image is used. In addition, in step S201, processor 101 extracts only the image of the first frame among the acquired images, and executes the following steps 202 to S205 with respect to the extracted image.

Figure 3:
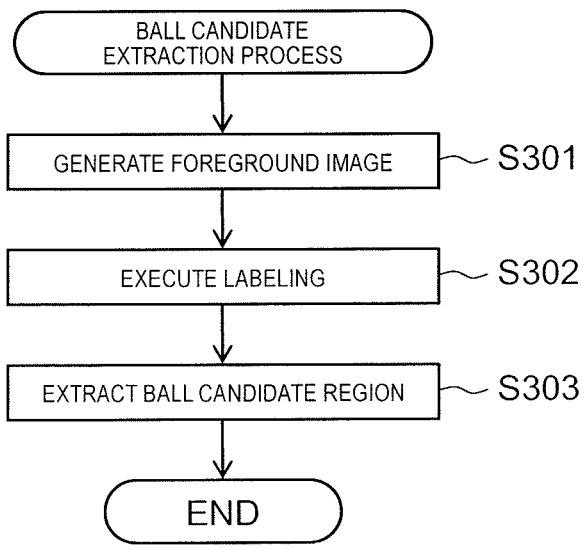
FIG. 3 is a flowchart for describing an example of an operation of a ball candidate extraction process.

In step S202, processor 101 extracts a ball candidate region from the image of the first frame extracted in step S201. The ball candidate region means a region where it is highly possible that the ball is present in the image. FIG. 3 is a flowchart for describing an example of an operation of a ball candidate extraction process.

In step S301, processor 101 generates a foreground image of the image from the image of the first frame acquired in step S201. Here, the foreground image is a binary image in which a pixel value of a pixel configuring a background portion is set to zero (black) and a pixel value of a pixel configuring a foreground portion is set to 255 (white). As a foreground image generation method, a known background difference method, an inter-frame difference method, or the like may be adopted.

Next, in step S302, processor 101 executes a labeling process with respect to each pixel of the foreground image. The labeling process is a process of grouping pixels by giving the same label to pixels having the same pixel value.

Finally, in step S303, processor 101 acquires the size (for example, region width, region height, aspect ratio or foreground ratio in region, and the like) of a pixel region to which the same label is given from an execution result of the labeling process, and detects a pixel region in which the acquired size satisfies a predetermined condition as the ball candidate region. In addition, in the present exemplary embodiment, the ball candidate region is a circumscribed rectangle, that is, a rectangle circumscribing a pixel region to which the same label is given. The predetermined condition is, for example, upper limits and lower limits of the region width and the region height, an upper limit and a lower limit of the aspect ratio, a lower limit of the foreground ratio in the region, or the like, and the ball candidate region is a region of the foreground image of the size corresponding to the ball.

In addition, the size corresponding to the ball is designated by processor 101 reading and designating the minimum size and the maximum size of the region corresponding to the ball which is predetermined and stored in storage unit 102 or the like, or designated based on a value set in the control program of the ball candidate region extraction process. Here, the minimum size may be changed according to the position in the y axis direction on the image. This is because in a case in which the ball is positioned on an upper portion of the image, that is, on the back side of a stadium, since the position from the camera to the ball is far, the ball has property of appearing small, and in contrast, in a case in which the ball is positioned on a lower portion of the image, that is, on the front side of the stadium, since the position from the camera to the ball is near, the ball has property of appearing big. In addition, regarding the maximum size, the value is not changed according to the position in a case in which the ball is floating away from the ground by a long pass or the like at a distance close to the camera, because the ball appears big even though the ball is positioned in the upper portion of the image in such a case.

Here, processor 101 may display the extracted ball candidate region on display unit 105, and allow the user to check the ball candidate region. That is, processor 101 displays the image of the first frame on display unit 105, and allows the user who sees the image to designate the region where the ball is present via input unit 104, so as to set the ball region. At this time, display unit 105 may display the extracted ball candidate region, and the user may designate the region where the ball is present among the plurality of ball candidate regions.

Processor 101 generates information on the position, the region width, the region height in the image of the extracted ball candidate region, and the image. After completion of the process in step S303, processor 101 ends the ball region extraction process illustrated in FIG. 3.

The description returns to FIG. 2. In step S203, processor 101 sets the ball region in the image of the first frame. The ball region is information indicating one region among the ball candidate regions set in step S203. As described above, the setting of the ball region by processor 101 is performed by enabling the user to designate the position where the ball is present in the image of the first frame including and displaying the ball candidate region.

In step S204, processor 101 acquires information on the ball position related to the set ball region. The information on the ball position includes, for example, coordinates in the image of an upper left pixel of the ball region in the image, or coordinates of the center of the ball region. In addition, the information on the ball position includes information (hereinafter, referred to as ball size information) such as information on the number of pixels corresponding the width and the height of the ball region.

In step S205, processor 101 stores the information on the ball position acquired in step S204 in storage unit 102 and outputs the information.

Figure 4:
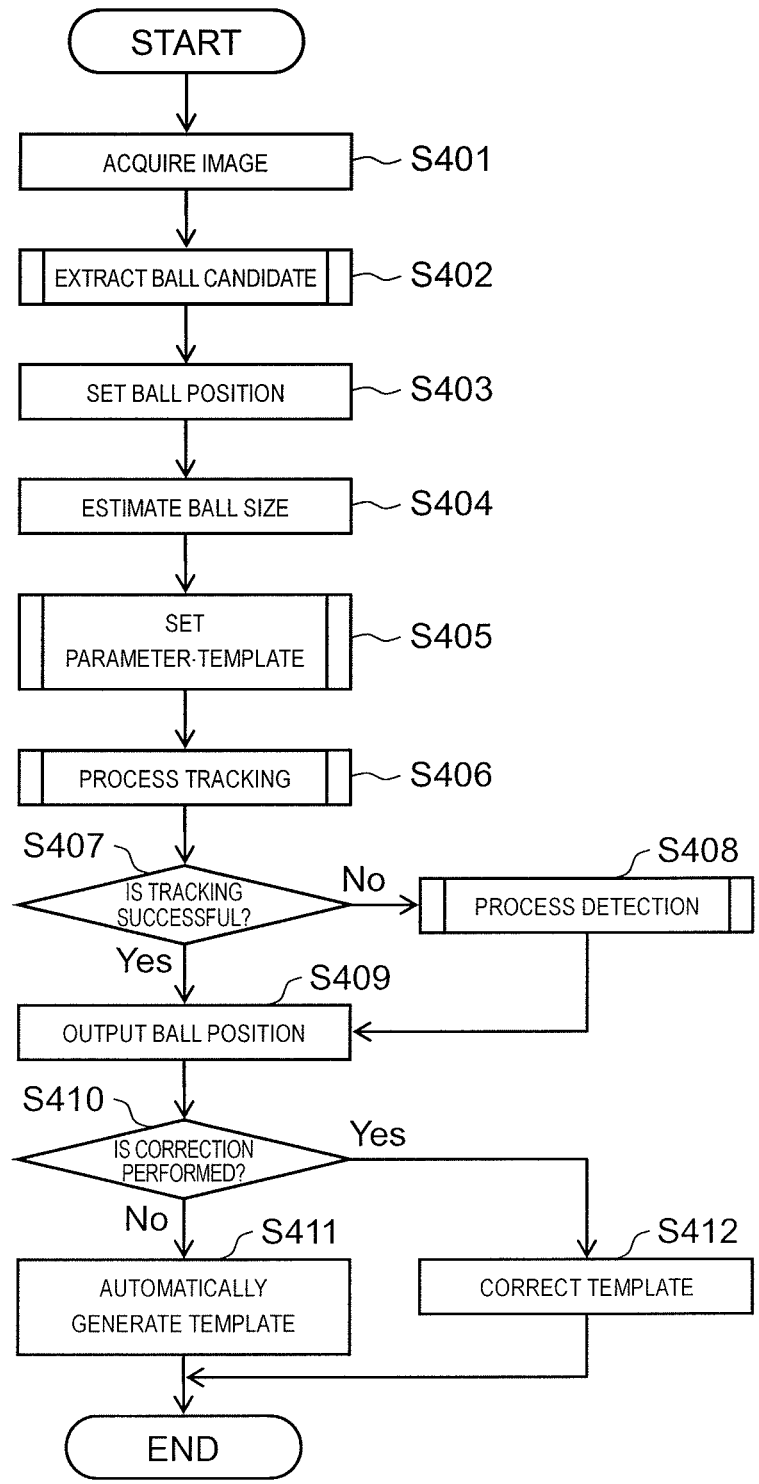
FIG. 4 is a flowchart for describing an example of an operation of the moving body tracking device with respect to an image after a second frame.

The example of the operation of moving body tracking device 100 with respect to the image of the first frame is described above. Next, the operation of moving body tracking device 100 with respect to an image after a second frame is described. FIG. 4 is a flowchart for describing an example of the operation of moving body tracking device 100 with respect to the image after the second frame. In addition, the image after the second frame means an image, other than the above described image of the first frame, among the images acquired by moving body tracking device 100. Hereinafter, a frame set as a target of a process is referred to as a current frame.

In step S401, processor 101 acquires the image from the external camera or the like. In step S401, processor 101 extracts the image after the second frame other than the image of the first frame, among the acquired images. The following steps are executed with respect to the extracted image of the current frame after the second frame.

In step S402, processor 101 extracts the ball candidate region with respect to the image of the current frame extracted in step S401. Regarding the ball candidate region extraction process, since the ball candidate region extraction process is the same as that described with reference to FIG. 3 except that the target frame is the image of the frame after the second frame, the description is omitted here.

In step S403, processor 101 estimates the ball position in the current frame. As a method of estimating the ball position, for example, there are following methods.

As a first method, there is a method in which information on the ball position in an image of a previous frame is read from storage unit 102, and the position is set as an estimation position in the current frame.

In addition, as a second method, there is a method in which the movement amount of the ball in one frame is estimated, the movement amount is added to the ball position in the image of the previous frame, and the position in the current frame is set as the estimation position. For example, the movement amount in the one frame may be set by calculating the movement amount between an image of past n frames before and an image of n+1 frames before and setting the movement amount in the one frame as an average of the movement amount of the past n+1 frames. Here, n is a positive integer. Alternatively, as a method of setting the movement amount in the one frame, a weighted average may be set so that the weight of the movement amount between past frames is small so that the weight of the movement amount between frames closer to the current frame is large.

In addition, the method of estimating the ball position exemplified here is only an example, but the present disclosure is not limited thereto. Processor 101 may calculate the estimation position in the current frame by any method, from the ball position in the past frame.

In step S404, processor 101 estimates the ball size in the current frame. As a ball size estimation method, for example, there is the following method. That is, there is a method in which information on the ball size of the past frame is read from storage unit 102 and the ball size is set as the estimation size of the current frame based on the information.

Specifically, for example, there is a method in which the ball size of the past frame is set as the estimation size of the current frame as it is. In addition, there is a method in which an average of the ball sizes of a plurality of past frames is set as the estimation size of the current frame. The average value may be a weighted average value obtained by increasing the weight of a frame closer to the present.

In addition, in steps S403 and S404, the estimation position or the estimation size of the current frame is calculated using information on the ball position or the ball size of the past frame. However, since it is not always possible to acquire the information on the ball position or the ball size in the past frame, the estimation position or the estimation size of the current frame may be set using only information on the remaining past frames in such a case.

In addition, the calculation of the estimation position in step S403 and the calculation of the estimation size in step S404 are not necessarily sequentially executed, and the order may be switched or the calculations may be performed at the same time.

Next, in step S405, processor 101 sets a parameter. In addition, in step S405, processor 101 generates a template feature amount and a template image for tracking the ball based on the information on the region where the ball is present, the information on the estimation position of the ball, and the information on the ball size. In addition, in step S405, processor 101 updates the parameter, the template feature amount, and the template image based on a tracking process in step S406 or a detection process in step S408 which will be described later.

Details of a specific process of a method of generating the parameter, the template feature amount, and the template image will be described below using FIG. 5. In addition, in the present exemplary embodiment, as a common name of a term including at least one of the parameter, the template feature amount, and the template image, a term of template data is used.

Figure 5:
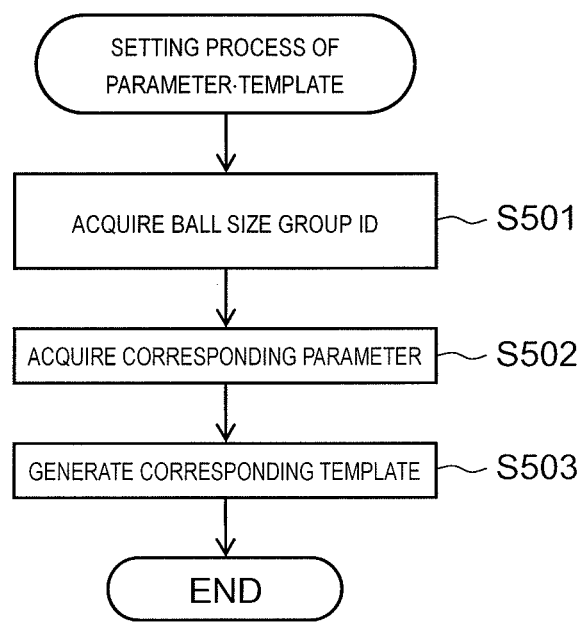
FIG. 5 is a flowchart for describing an operation example of a setting process of template data.

FIG. 5 is a flowchart for describing an operation example of a setting process of the template data.

In step S501, processor 101 acquires a ball size group ID including the ball size using the ball size in the current frame.

The ball size group ID is described. First, a ball size group is a group divided according to a value of the ball size. In the present exemplary embodiment, three ball size groups of a ball size small, a ball size medium, and a ball size large are set. FIG. 6 is a diagram for describing a method of dividing the ball size group. As illustrated in FIG. 6, the minimum size and the maximum size are set in each group. The minimum size is the minimum value (pixel) of the ball size belonging to the group, and the maximum size is the maximum value (pixel) of the ball size belonging to the group.

In addition, the ball size is determined by the number of pixels obtained by adding the width and the height of the ball region on a screen. For example, in a case in which the width of the ball region is four pixels, and the height of the ball region is four pixels, the ball size is eight pixels, and in a case in which the width of the ball region is ten pixels, and the height of the ball region is six pixels, the ball size is sixteen pixels. As described above, since the width and the height of the ball region on the image are positive integers, the ball size is also a positive integer. In addition, the minimum size of each group is a value obtained by adding one to the maximum size of an immediately lower group.

The ball size group ID is an ID given for each ball size group in advance. In the present exemplary embodiment, as illustrated in FIG. 6, the group ID "G01" is set to the ball size small, the group ID "G02" is set to the ball size medium, and the group ID "G03" is set to the ball size large.

The description returns to FIG. 5. Next, in step S502, processor 101 acquires a parameter corresponding to the ball size group ID. FIG. 7 is a diagram for describing a method of acquiring the parameter corresponding to the ball size group.

As illustrated in FIG. 7, the parameter corresponding to the ball size group ID is predetermined and stored in storage unit 102. Processor 101 reads this and acquires the parameter corresponding to step S501. As illustrated in FIG. 7, the parameter includes a ball width change amount, a ball height change amount, a movement distance, a tracking threshold value, and a detection threshold value. The ball width change amount and the ball height change amount are change amounts of the width and the height of the ball per one frame. The movement distance is the maximum movement distance of the ball per one frame. The tracking threshold value is a distance threshold value between color histogram data generated based on an inscribed rectangle region of the ball in the current frame and the template feature amount. The tracking threshold value is used in the tracking process in step S406 described later. In addition, the detection threshold value is a distance threshold value between the color histogram data generated based on the inscribed rectangle region of the ball in the current frame and the template feature amount. The detection threshold value is used in the position detection process in step S408 described later.

The description returns to FIG. 5. In step S503, processor 101 acquires the template image and the template feature amount corresponding to the ball size group ID. The template image is an image of the circumscribed rectangle region of the ball set corresponding to the ball size group ID. The template feature amount is the color histogram data set corresponding to the ball size group ID. That is, the template feature amount is data indicating a frequency distribution of a color of the ball according to the size of the ball on the image.

The histogram data used in generating the template feature amount may be changed in the number of bins based on, for example, the ball size estimated in step S404. Specifically, in a case in which the ball size is large, that is, in a case in which the number of the pixels of the ball region is large, the number of the bins is large, and in a case in which the ball size is small, that is, in a case in which the number of the pixels of the ball region is small, the number of the bins is reduced to ½, ¼, or the like. In addition, in a case in which the number of the bins changes as described above, it is preferable to prepare the entire histogram of the number of the bins which may be used at the timing when the template feature amount is generated.

The template feature amount is used in the comparison with the color histogram data generated based on the image of the inscribed rectangle region of the ball in the current frame. The reason why the inscribed rectangle region of the ball is used in the template feature amount is to exclude information on the outline vicinity strongly influenced by a grass region and a color of the grass in the vicinity of the ball. In the present exemplary embodiment, the template image and the template feature amount may be independently generated, or in a case in which the template feature amount is updated, the template image may be generated from the image generating the corresponding template feature amount. That is, the ball image (circumscribed rectangle region image) corresponding to the ball image (inscribed rectangle region image) used in generating the template feature amount may be used as the template image. In addition, the template feature amount may be a feature amount in an image field, and data other than the histogram data may be used.

In order to improve the detection accuracy of the ball, it is preferable to set the template feature amount according to an environment condition of the stadium, such as the weather and time zone of the stadium of the day, that is, the brightness of the stadium, the presence or absence of lighting, and the presence or absence of a rainfall. Therefore, it is preferable that the template feature amount is created in advance, for example, before the game is started, and is newly created according to the change in the brightness or the weather of the stadium during the game.

A specific example of a method of setting the template feature amount will be described. In the present exemplary embodiment, as the method of setting the template feature amount, the following three methods are assumed. A first method is a method in which an image appearing the ball in the stadium is acquired in advance before the game is started, and the template feature amount is created based on the image of the ball in the corresponding image.

That is, processor 101 acquires the image appearing the ball inside the stadium from the external camera or the like in a condition of the stadium identical to that during the game in advance before the game is started, and creates the template feature amount. Here, it is preferable that at least one template feature amount is created for each ball size group. Therefore, for example, processor 101 creates the template feature amount corresponding to each of the ball sizes, based on an image of a case in which the ball is present in the back side of the stadium, an image of a case in which the ball is present in the vicinity of the center of the stadium, and an image of a case in which the ball is present in the front side of the stadium.

The template feature amount generated in a case in which the ball is present in the back side of the stadium is a template feature amount corresponding to a ball size group small (ball size group ID is G01). In addition, the template feature amount generated in a case in which the ball is present in the vicinity of the center of the stadium is a template feature amount corresponding to a ball size group medium (ball size group ID is G02). In addition, the template feature amount generated in a case in which the ball is present in the front side of the stadium is a template feature amount corresponding to a ball size group large (ball size group ID is G03). The template feature amounts generated as described above correspond to the ball size group and are stored in storage unit 102 so as to be freely read.

In addition, the template feature amount may be generated from one image for each ball size group, however, it is preferable to generate the template feature amount from an average of the pixel values of the pixels corresponding to the ball in a plurality of images since the accuracy of the tracking process or the detection process which will be described later is increased. This is because an influence of an image environment (lighting condition, background reflection state, ball texture, and the like) is large in one image. Therefore, processor 101 may acquire a plurality of images of the same ball size group and generate the template feature amount using the average of such pixel values. In addition, as the template feature amount a color histogram generated based on pixel values of all of the acquired plurality of images may be used, or a color histogram generated based on pixel values of a part of the acquired plurality of images may be used. This is because in a case in which an excessively large number of images are used, the color histogram calculated as the template feature amount becomes dull and there is a possibility that an incorrect detection increases. Therefore, the number of the images may be appropriately determined in consideration of a balance with the degree of increase of the incorrect detection.

In the above described first method, the template feature amount is generated before the game is started. However, for example, the template feature amount may be generated during a warming-up or the like just before the game is started. In addition, for example, the template feature amounts according to a weather condition, a lighting condition, or a type of a game ball may be generated in advance for each stadium and may be stored in storage unit 102, rather than generating the template feature amount for each game.

A second method is a method in which the template feature amount is generated at any time. As illustrated in FIG. 4, among the images acquired from the external camera or the like, in an image after a second frame, the tracking process in step S406 or the detection process in step S408 which will be described later is executed. In the tracking process or the detection process, in a case in which the ball in the image becomes large or small and information on the ball position of the size included in a ball size group different from those described above is acquired, processor 101 identifies the presence or absence of the template feature amount of a new ball size group, and in a case in which the template feature amount is absent, the processor 101 acquires an image including the ball at that timing and generates a template feature amount.

The second method has an advantage that an effort of the user may be omitted since processor 101 automatically generates the template feature amount. In addition, generating a new template feature amount may be performed at a random timing other than a case in which the ball information on the size belonging to the new ball size group is acquired. For example, a ball size of which the template feature amount is to be generated may be set in advance, and the generation of the template feature amount may be performed at the timing when the ball size reaches that size. As an example, by generating a template feature amount belonging to the corresponding ball size group at the time when the ball size reaches initially to an intermediate value between the maximum size and the minimum size of the ball size group, a track performance of the ball is improved in comparison with by generating the template feature amount at the time when a change of the ball size group occurs, because it is possible to generate the template feature amount of the ball close to an average size of the ball size group.

As a third method, there is a method in which the new template feature amount is generated at the timing when the ball is lost. In the image after the second frame, in a case in which the ball is lost as a result of the track and detection processes, the process for the first frame illustrated in FIG. 2 is performed again. In the third method, at that time, in a case in which the user sets the ball position (corrects the ball position) in step S203, processor 101 generates the template feature amount using the image at the timing.

In addition, in the second and third methods, an initial value of the template feature amount may be generated by processor 101 at the timing when the ball region is set by the operation of the user in the image of the first frame. In addition, the first method may be used in combination with the second and third methods. That is, at the time when the game is started, processor 101 may perform the track and detection processes using the template feature amount generated before the game is started, and then, may perform the generation of the template feature amount by the second method or the third method at any time. In addition, for example, the generation of the template feature amount may be performed at the timing when the ball region is set by the user in step S203 of FIG. 2, other than the performance in step S405.

In addition, in the above description, in the parameter-template setting process executed in step S405, the setting of the template image and the template feature amount is performed after the performance of the setting of the parameter, however, the present disclosure is not limited thereto. The setting process of the parameter, and the setting process of the template image and the template feature amount may be independent of each other, and may be performed at the same time, or any of them may be first performed. In addition, any of the setting process of the parameter, and the setting process of the template image and the template feature amount may be performed.

Figure 8:
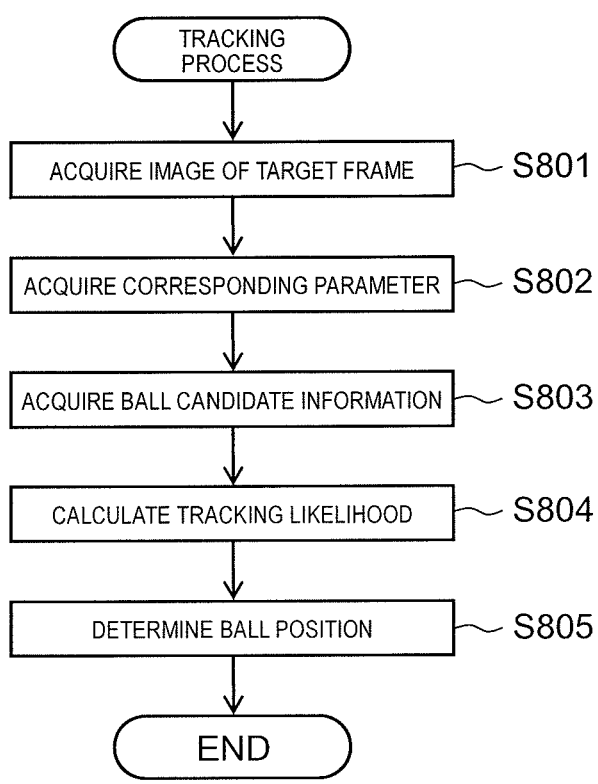
FIG. 8 is a flowchart for describing an example of an operation of a tracking process.

The description returns to FIG. 4. In step S406, processor 101 performs the ball tracking process using the parameter and/or the template feature amount set in step S405. FIG. 8 is a flowchart for describing an example of an operation of the tracking process.

In step S801, processor 101 acquires the sports image from the external camera or the like, and extracts the image of the current frame. In addition, in step S802, processor 101 acquires the estimation position calculated in step S403, the estimation size calculated in step S404, and the parameter and the template feature amount set in step S305 as the template data. In addition, in step S803, processor 101 acquires information on the ball candidate region extracted in step S202 or step S402.

In addition, in step S804, processor 101 calculates tracking likelihood based on the feature amount of the ball candidate region (ball candidate region feature amount) and the template data. The ball candidate region feature amount includes the position, the region width, the region height, and color information (in the present exemplary embodiment, color histogram) in the image of the ball candidate region. The tracking likelihood is obtained by calculating a weighted average of (1) a likelihood based on the distance between the color histogram in the ball candidate region feature amount and the color histogram in the template feature amount and (2) a likelihood obtained by comparing each of the ball width change amounts·ball height change amounts·parameters set based on the movement distance and the ball size (ball width change amount·ball height change amount-movement distance) in the ball candidate feature amount.

In addition, the distance between the histograms is calculated using, for example, Bhattacharyya distance. In this case, in a case in which the histograms are completely equal to each other, the distance between the histograms is zero, and in a case in which the histograms are completely different from each other, the distance between the histograms is one. Therefore, the likelihood based on the distance between histograms is calculated by 1−(Bhattacharyya).

In step S805, processor 101 determines the ball candidate region in which the calculated tracking likelihood is equal to or greater than a predetermined threshold value and the tracking likelihood is highest as the ball position, and outputs and stores the determined ball position in storage unit 102. In addition, as the predetermined threshold value, a tracking threshold value included in the parameter set in step S405 may be used.

The description returns to FIG. 4. In step S407, processor 101 determines whether or not the ball position is able to be determined by the tracking process in step S406. In step S407, in a case in which the ball candidate region where the tracking likelihood calculated in step S804 illustrated in FIG. 8 is equal to or greater than the tracking threshold value is present, the processor 101 determines that it was able to determine the ball position at the ball candidate region having the highest tracking likelihood. In a case in which it is possible to determine the ball position, the process proceeds to step S409. On the other hand, in step S407, in a case in which the ball candidate region where the tracking likelihood calculated in step S804 is equal to or greater than the tracking threshold value is not present, it is determined that it is impossible to determine the ball position. In a case in which it is determined that it is impossible to determine the ball position, the process proceeds to step S408.

Figure 9:
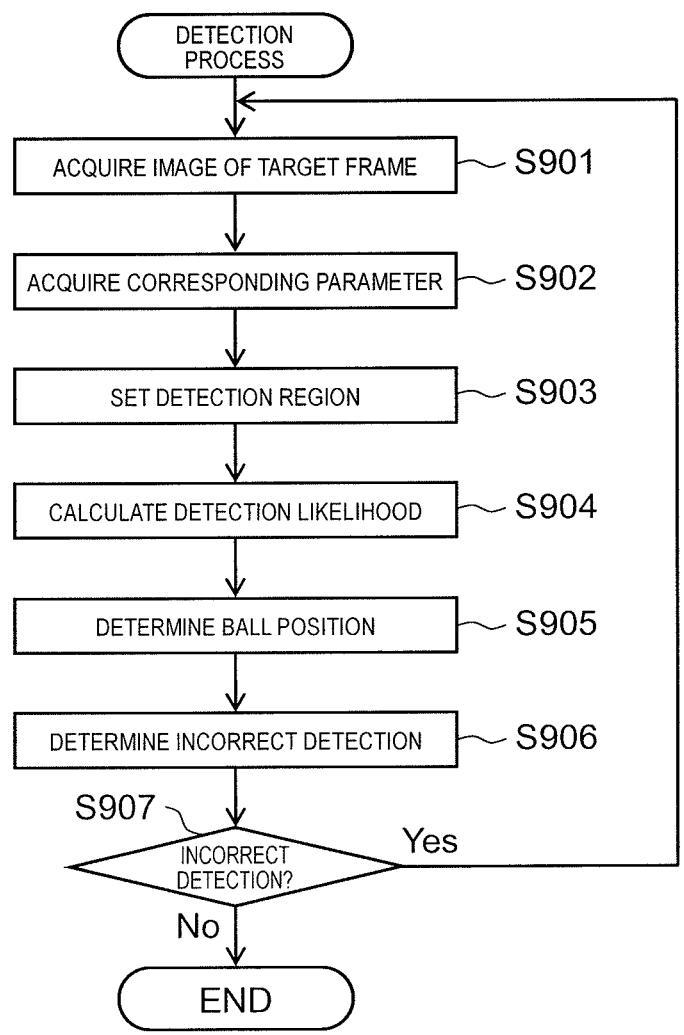
FIG. 9 is a flowchart for describing an example of an operation of a detection process.

In step S408, in a case in which the track fails, processor 101 performs the detection process for detecting the ball. FIG. 9 is a flowchart for describing an example of an operation of the detection process.

In step S901, processor 101 acquires the image of the current frame. In addition, in step S902, processor 101 acquires the estimation position calculated in step S403, the estimation size calculated in step S404, and the parameter and the template image set in step S405 as the template data.

In step S903, processor 101 sets a detection region for performing the detection process, based on the estimation position. The detection region includes the estimation position, and is a region larger than the estimation position. The size of the detection region may be set in the control program in advance. Alternatively, a predetermined and stored value may be read from storage unit 102. In addition, processor 101 may change the size of the estimation position based on the estimation size. For example, in a case in which the ball size is large, since the movement amount of the ball per frame is large, it is preferable to increase the detection region. On the other hand, in a case in which the ball size is small, the detection region may be small.

In step S904, processor 101 raster-scans inside the detection region with a rectangle of the estimation size, and calculates a detection likelihood for each small region of a case in which the detection region is divided by the rectangle of the estimation size. The detection likelihood may be calculated similarly to the above described tracking likelihood. In addition, in a case in which the detection likelihood is calculated, since it is known that the value of the ball width change amount and the ball height change amount is set as the value equal to the estimation size (since the region is the region where the raster-scan is performed). Thus, it is preferable to exclude the value of the ball width change amount and the ball height change amount from the determination of the likelihood, thereby the detection can be performed at a higher speed without reducing the accuracy.

In step S905, processor 101 determines a small region in which the detection likelihood is equal to or greater than a predetermined threshold value and the likelihood is the highest as the ball position, and outputs the determined ball position. For example, as the threshold value, the detection threshold value included in the parameter set in step S405 may be used.

In step S906, processor 101 determines whether or not the ball position determined in step S905 is correct, that is, whether or not the ball position is incorrectly detected. In the incorrect detection determination, the color information of a peripheral region of the ball position determined in step S905 is compared with the color information of a peripheral region of the ball in the template image. In a case in which the similarity thereof is equal to or greater than the detection threshold value, it is determined that the detection result is incorrect, and otherwise, it is determined that the detection result is correct. For example, the determination of the incorrect detection is performed in order to prevent the incorrect detection in which a region of a color and a size similar to those of the ball, such as a signboard at the back of the stadium is detected as the ball position, in a case in which the ball size is small, or the like. The color information on the vicinity of the ball is, for example, information on a color of a grass of the stadium.

As an example of a specific method of determining the incorrect detection determination, for example, a region where the inscribed rectangle of the ball is excluded from the circumscribed rectangle of the ball is set as an incorrect detection determination region, and the distance between histograms of a color histogram calculated from an incorrect detection determination region in the template image and a color histogram calculated from an incorrect detection determination region corresponding to the ball position detected in the above described detection process is calculated, so as to calculate an incorrect detection determination likelihood by Bhattacharyya distance. As a result, in a case in which the ball positions are completely equal to each other, that is, in a case in which the detection is not the incorrect detection, the incorrect detection determination likelihood is zero, and in a case in which the ball positions are completely different from each other, that is, in a case in which the detection is the incorrect detection, the incorrect detection determination likelihood is one. Actually, the incorrect detection determination likelihood is a value from zero to one, and in a case in which the incorrect detection determination likelihood is equal to or greater than a predetermined threshold value, processor 101 determines that the ball position obtained in the above described detection process is the incorrect detection. Such an incorrect detection occurs by a determination of a region or the like, other than the ball, having a color similar to that of the ball, such as a signboard at the back of the stadium, as the ball position, in a case in which the ball is far from the camera and the size on the image is small, or the like. That is, in determining whether or not the ball position is incorrectly detected in step S906, it is possible to determine whether or not the incorrect detection with high accuracy, by using color information or the like of a region such as a grass positioned in the vicinity of the ball.

In step S907, in a case in which it is determined the incorrect detection is made as a result of the incorrect detection determination in step S906, the process returns to step S901 and the detection process is performed again. In addition, in a case in which the detection process is performed again, it is preferable to perform the detection process again by setting the detection threshold value so as to be less than a previously used value. In a case in which the detection is not able to be performed even though the detection process is performed again by a predetermined number of times, it is determined that the ball position is not able to be detected again and the process is ended. On the other hand, in a case in which it is not determined that the incorrect detection is made, processor 101 outputs the ball position of the detection result and ends the detection process.

In addition, in a case in which it is impossible to detect the ball position again by the above described detection process, processor 101 may perform the process of the first frame illustrated in FIG. 2 again and receive the correction of the ball position by the user. Besides, in a case in which it is impossible to detect the ball position, processor 101 temporarily may maintain information that the ball position of a frame which is a current target is not able to be obtained and the ball position of the previous frame, and may interpolate the ball position while the ball position is not obtained to a frame in which the ball position is not detected at the timing when the ball position is obtained in the tracking process or the detection process after the next frame, to collectively output the interpolated ball position.

The description returns to FIG. 4. In step S409, processor 101 stores the ball position obtained in the tracking process in step S406 or the ball position detected again in the detection process in step S408 in storage unit 102 and outputs the ball position.

Next, in step S410, processor 101 determines whether or not the ball position is corrected. In the process illustrated in FIG. 4, for example, the ball position obtained by the tracking process in step S406 or the detection process in step S408 is displayed to the user, and the user performs a visual check. In a case in which the displayed ball position is correct, the correction is not performed, and in a case in which the displayed ball position is not correct, the correction of the ball position by the user is performed. In a case in which it is determined that the correction is performed, the process proceeds to step S411, and otherwise, the process proceeds to step S412.

In step S411, in a case in which the ball size reaches the size belonging to the new ball size group in the tracking process in the step S406, processor 101 automatically generates and sets a new template image using an image of the corresponding ball size. Step S411 corresponds to the second method of the template image setting method described above.

On the other hand, in step S412, processor 101 sets a new template feature amount. Step S410 corresponds to the third method of the template feature amount setting method described above.

In a case in which updating the template feature amount in step S411 or step S412 is ended, moving body tracking device 100 ends the process for the image of the frame which is the current target, and starts the process of the image for the next frame from step S401. In addition, in a case in which the process for the images of all frames included in the image acquired by the external camera or the like is ended, moving body tracking device 100 ends all processes and is in a standby state.

The operation example of the moving body tracking device 100 according to the present exemplary embodiment is described above. As described above, a moving body (ball) tracking method by moving body tracking device 100 according to the present exemplary embodiment includes estimating the size of the moving body in each of the images of the frames, updating template data based on the estimated size of the moving body, and comparing a candidate region that is a candidate of a region where the moving body is present in each of the images of the frames with the template data, and determining whether or not the moving body is positioned in the candidate region based on the comparison result.

With this configuration, according to moving body tracking device 100 of the present exemplary embodiment, the position of the moving body (ball) is determined using the template image and the parameter set corresponding to the size of the ball. Therefore, for example, even in a case in which the size of the ball in the front side and the size of the ball in the back side of the image are largely different from each other, it is possible to determine the ball position with high accuracy.

In addition, since the template image or the parameter change according to the size of the ball, it is not necessary for the user to manually set the template or the parameter according to the size of the ball, and thus it is possible to omit the effort of the user. In addition, in the moving body (ball) tracking method by moving body tracking device 100 according to the present exemplary embodiment, the template data includes the parameter updated based on the estimated size of the moving body, and the parameter includes at least a predetermined threshold value for detecting the ball or a predetermined threshold value for tracking the ball.

With this configuration, the ball position is determined using the parameter changed according to the size of the ball. Therefore, for example, even in a case in which the size of the ball in the front side and the size of the ball in the back side are largely different from each other, it is possible to determine the ball position with high accuracy.

In addition, in the moving body (ball) tracking method by moving body tracking device 100 according to the present exemplary embodiment includes changing the template data used for the comparison according to a stage to which the estimated size of the moving body belongs, among a plurality of stages.

In addition, in the moving body (ball) tracking method by moving body tracking device 100 according to the present exemplary embodiment includes generating the template feature amount corresponding to the changed stage, by using an image in a vicinity of the estimated position in a case in which the estimated size of the moving body changes to another stage of the plurality of stages.

With this configuration, it is possible to appropriately set the template image and the parameter according to the size of the ball.

In addition, in the moving body (ball) tracking method by moving body tracking device 100 according to the present exemplary embodiment includes scanning a rectangle region in the image of the frame by sequentially comparing the rectangle region with the template data in a case in which a candidate region satisfying a condition is not present, and determining whether or not the moving body is present in the rectangle region based on the comparison result, and generating the template image using an image in a vicinity of the rectangle region where it is determined that moving body is present.

With this configuration, even in a case in which the ball is out of sight, it is possible to detect the ball again and use the template feature amount and the parameter according to the size of the ball in the detection of the ball. Therefore, it is possible to appropriately detect the ball position regardless of the size of the ball.

In addition, the above described exemplary embodiment is an example of the present disclosure, and the present disclosure is not limited thereto. Hereinafter, modification example of the present disclosure will be described.

Modification Example 1

In the above described exemplary embodiment, the tracking process and the detection process are performed using the template data (parameter and template feature amount) corresponding to the estimation position and the estimation size of the ball described above. However, in Modification Example 1, in addition to such processes, a trajectory detection process for detecting a trajectory of the ball is performed in parallel.

Figure 10:
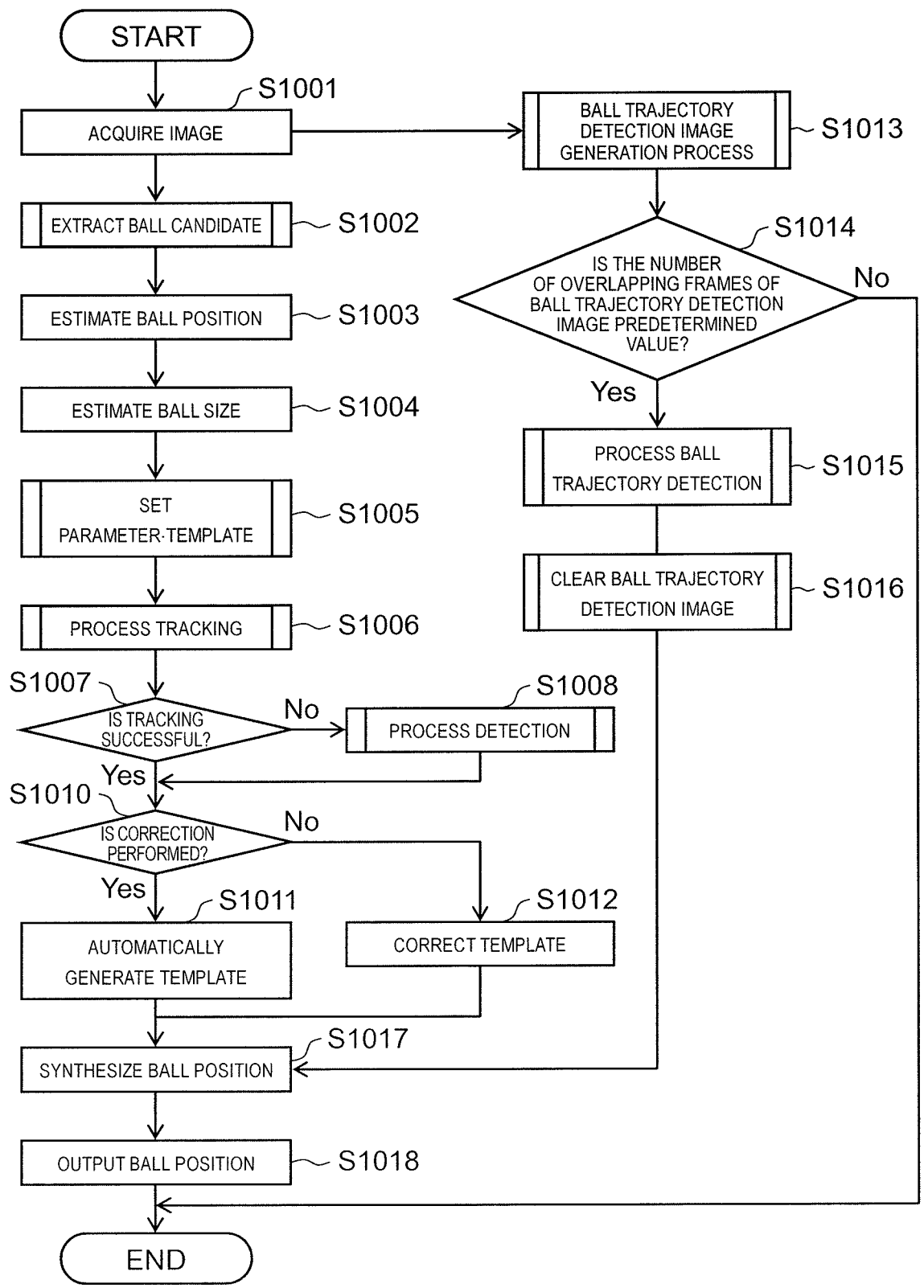
FIG. 10 is a flowchart for describing an example of an operation of moving body tracking device 100 in Modification Example 1.

FIG. 10 is a flowchart for describing an example of an operation of moving body tracking device 100 in Modification Example 1. In steps S1001 to S1008 and S1010 to S1012 in FIG. 10, the same processes as those of the above described steps S401 to S408 and S410 to S412 in FIG. 4 are performed. Therefore, in the following description of the operation example of Modification Example 1 illustrated in FIG. 10, descriptions of steps S1001 to S1008 and S1010 to S1012 will be omitted, and steps S1013 to S1016 which are newly added in FIG. 10 will be described.

Figure 11:
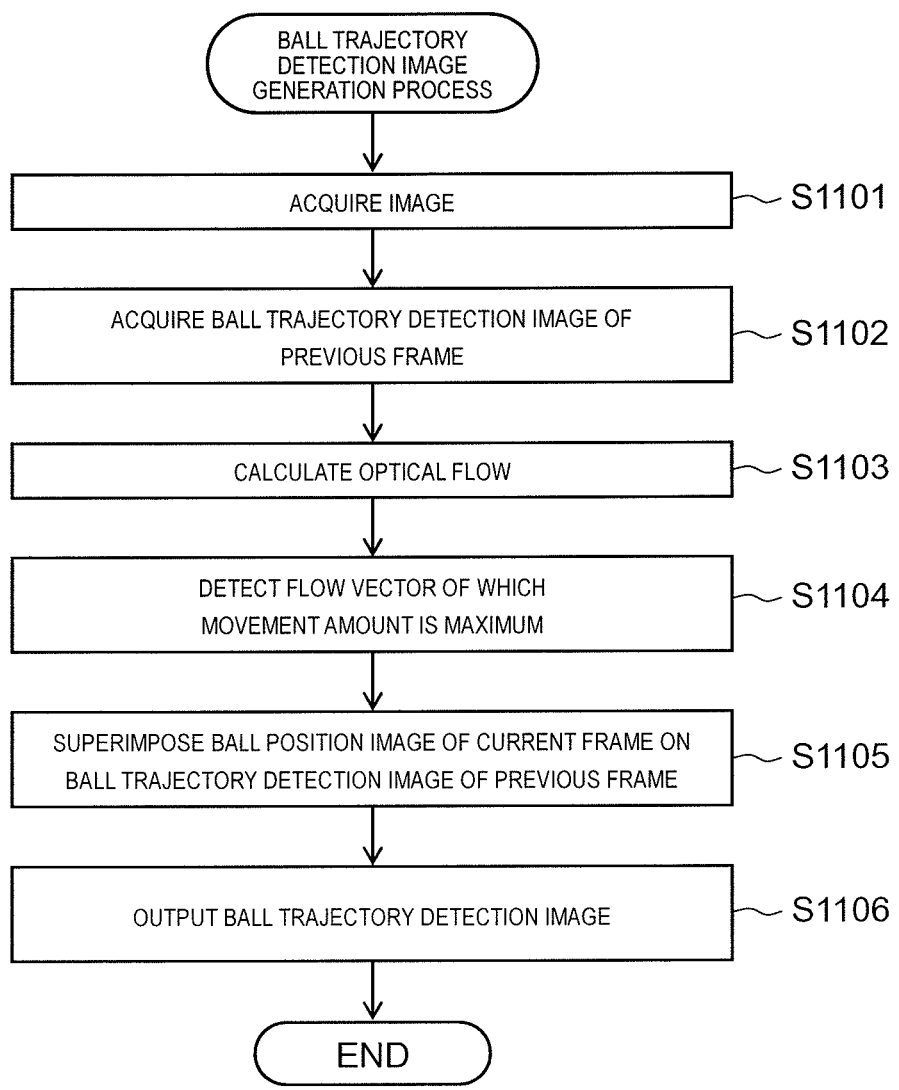
FIG. 11 is a flowchart for describing an example of an operation of a ball trajectory detection image generation process.

In step S1013, in a case in which the image after the second frame is acquired from the external camera or the like, processor 101 executes a ball trajectory detection image generation process. FIG. 11 is a flowchart for describing an example of an operation of the ball trajectory detection image generation process.

In step S1101, processor 101 acquires the image of the current frame. In addition, in step S1102 processor 101 acquires a ball trajectory detection image of a previous frame from storage unit 102.

In step S1103, processor 101 calculates an optical flow using the image of the current frame acquired in step S1101 and the image of the previous frame of the current frame, which is acquired in step S1102. Specifically, processor 101 obtains pixels of the image of the current frame, to which each pixel of the image of the previous frame is moved, that is, a flow vector.

Next, in step S1104, processor 101 detects a flow vector of which the movement amount is the maximum among all flow vectors, by using the optical flow calculated in step S1103.

In step S1105, processor 101 superimposes an image indicating the position (place) of the pixel corresponding to the flow vector of which the movement amount is the maximum detected in step S1104 on the ball trajectory detection image of the previous frame acquired in step S1102. Specifically, processor 101 sets a pixel value of the position in the vicinity of the pixel corresponding to the flow vector detected in step S1104 to 255 (white) in the ball trajectory detection image. For example, a rectangle region of 5×5 pixels or a circle region of 5 pixels in diameter is set in the vicinity of the position of the pixel corresponding to the flow vector, and the value of the pixel configuring such regions is set to 255. Therefore, a generated ball trajectory detection image includes a trajectory of the ball up to the current frame.

In addition, in step S1106, processor 101 outputs the ball trajectory detection image generated in step S1105, and counts the number of superimposed frames of the ball trajectory detection image. In addition, the output ball trajectory detection image is used in the ball trajectory detection process in step S1015 illustrated in FIG. 10, is input to and stored in storage unit 102, and is used in generating the ball trajectory detection image of the next frame.

Figure 12:
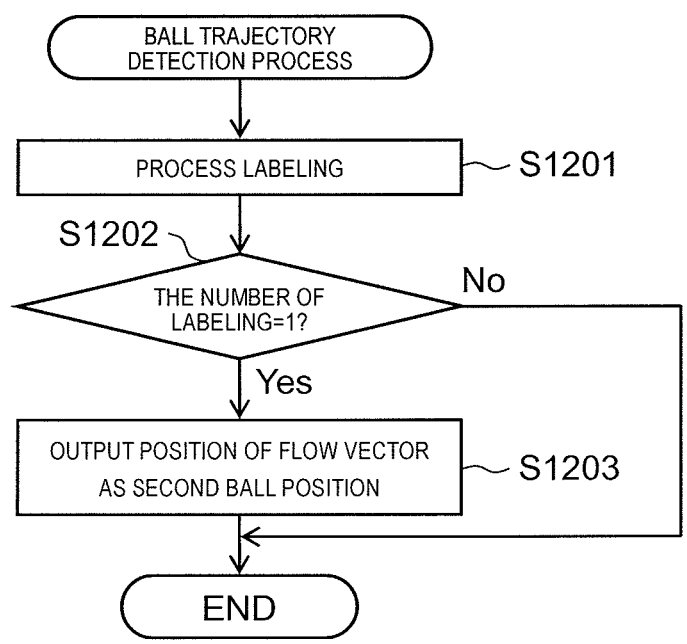
FIG. 12 is a flowchart for describing an example of an operation of a ball trajectory detection process.

The description returns to FIG. 10. In step S1014, processor 101 determines whether or not the number of the superimposed frames of the ball trajectory detection image is equal to a predetermined value, for example, 10. In a case in which the number is not equal to the predetermined value, the trajectory detection process is ended. On the other hand, in a case in which the number of the superimposed frames of the ball trajectory detection image is equal to the predetermined value, in step S1014, processor 101 performs the ball trajectory detection process using the ball trajectory detection image generated in step S1013. FIG. 12 is a flowchart for describing an example of an operation of the ball trajectory detection process.

In step S1201, processor 101 executes a labeling process with respect to the ball trajectory detection image generated in step S1013. In step S1201, as the labeling process, the same number is allocated to pixels having successive portions of which a pixel value is 255 (white).

Figure 13A:
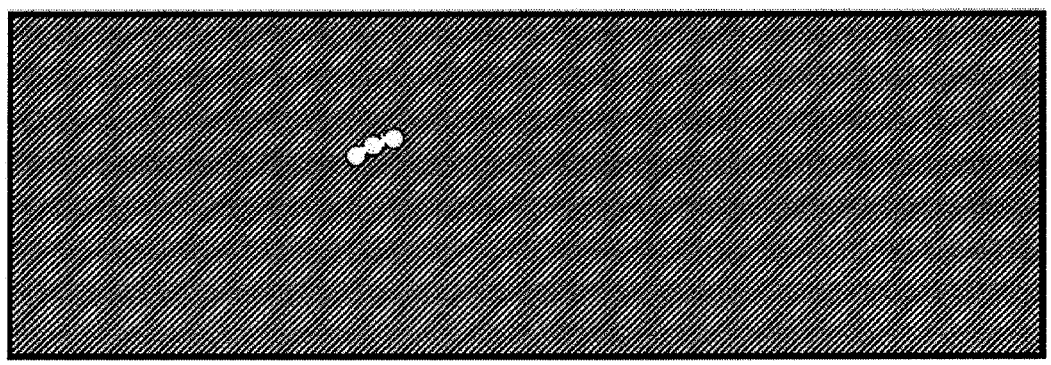
FIG. 13A is a diagram illustrating an example of a ball trajectory detection image of a case in which the number of labeling is one.
Figure 13B:
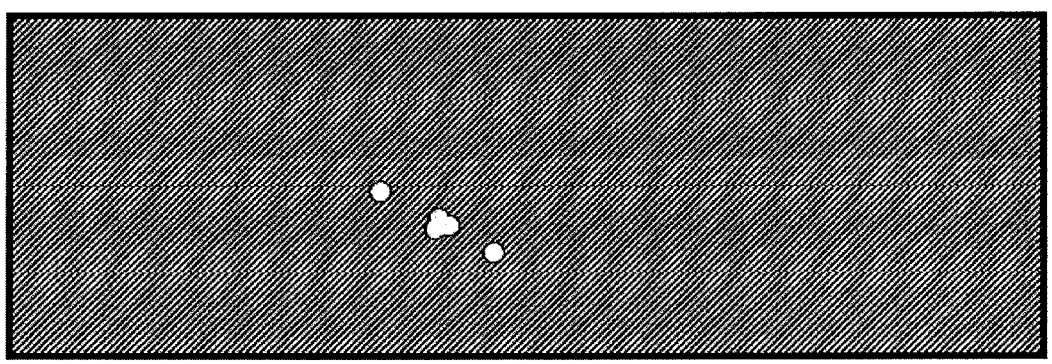
FIG. 13B is a diagram illustrating an example of the ball trajectory detection image of a case in which the number of the labeling is three.

In step S1202, processor 101 determines whether or not the number of labeling is one as a result of executing the labeling process. FIG. 13A is a diagram illustrating an example of the ball trajectory detection image of a case in which the number of the labeling is one. As illustrated in FIG. 13A, in a case in which the number of the labeling is one, a white portion, that is, the position of the pixel of which the movement amount is the maximum is connectively displayed, on the ball trajectory detection image. The connected portion indicates the trajectory of the ball on the corresponding image. On the other hand, FIG. 13B is a diagram illustrating an example of the ball trajectory detection image of a case in which the number of the labeling is three. As illustrated in FIG. 13B, in a case in which the number of the labeling is not one, a trajectory candidate of the ball is divided into the plural, and it is impossible to specify the trajectory of the ball.

In step S1202, in a case in which it is determined that the number of the labeling is one, the process proceeds to step S1203. Otherwise, the ball trajectory detection process is ended.

In step S1203, processor 101 outputs and stores the position of the flow vector on the ball trajectory detection image as a second ball position in storage unit 102.

In addition, in the ball trajectory detection process described with reference to FIG. 12, for example, a player region which is a pixel region corresponding to a player may be detected, and it may be determined whether or not the position of the flow vector on the ball trajectory detection image is included in the player region. Therefore, the trajectory of the ball and the trajectory of the player are not confused, and the detection accuracy of the trajectory of the ball is improved. As a method of detecting the player region, similarly to the above described method of detecting the ball, there is a method in which a feature amount of the pixel corresponding to the player is acquired in advance, the feature amount is compared with a feature amount of each region of the image of the current frame to calculate a likelihood of the player, and a region where the player likelihood is equal to or greater than a predetermined value is set as the player region.

The description returns to FIG. 10. In step S1016, processor 101 clears the ball trajectory detection image (specifically, colors the ball trajectory detection image with black (0)), and clears the number of the superimposed frames of the ball trajectory detection image so as to be zero.

In step S1017, processor 101 synthesizes the ball position generated in the tracking process in step S1006, or the ball position generated in the detection process in step S1008, and the ball position generated in the ball trajectory detection process in step S1015, and calculates the final ball position.

Specifically, processor 101 sets the ball position generated in the tracking process or the ball position generated in the detection process as a first ball position, and uses the second ball position generated in the ball trajectory detection process, so as to calculate the final ball position by the following method. Processor 101 calculates the distance between the first ball position and the second ball position. In a case in which the distance is equal to or greater than a predetermined threshold value, processor 101 sets the second ball position as the final ball position, and in a case in which the distance is less than the threshold value, processor 101 sets the first ball position as the final ball position.

The predetermined threshold value used in calculating the final ball position may be a fixed value or may be a value several times (for example, 1.5 times) of the long side of another ball. Alternatively, the threshold value may be set in advance as one of the parameters corresponding to the ball size group.

In addition, in a case in which only the first ball position is obtained, processor 101 sets the first ball position as the final ball position, and in a case in which only the second ball position is obtained, processor 101 sets the second ball position as the final ball position. In a case in which the first ball position and the second ball position are not obtained, processor 101 may perform a process up to a frame where any ball position is obtained, and at the timing when any ball position is obtained, may interpolate and collectively output the ball position during the period when the ball position is not obtained.

In step S1018, processor 101 outputs and stores the final ball position calculated in step S1017 in storage unit 102.

In addition, the ball trajectory detection process in step S1015 is not performed every frame. Because of a nature of the process of superimposing the position of the ball for each frame on the trajectory up to the previous frame, it is preferable to perform the ball trajectory detection process once for predetermined frames.

As described above, in the Modification Example 1, the ball position may be calculated by the tracking process or the detection process, the trajectory of the ball is detected predetermined frames, and the ball position may be determined with reference to both the ball position (first ball position) obtained by the tracking process or the detection process and the ball position (second ball position) obtained by the ball trajectory detection process. Therefore, the detection accuracy of the ball position is improved.

Modification Example 2

In Modification Example 2, a template image used in generating a template is displayed so that the user is able to visually recognize the template image, and an operation in which the user selects one or deletes one (or all) of a plurality of template images is received. Therefore, since it is possible to generate the template image according to the selection by the user, it is possible to prepare the template image more appropriate for a peripheral situation.

Figure 14:
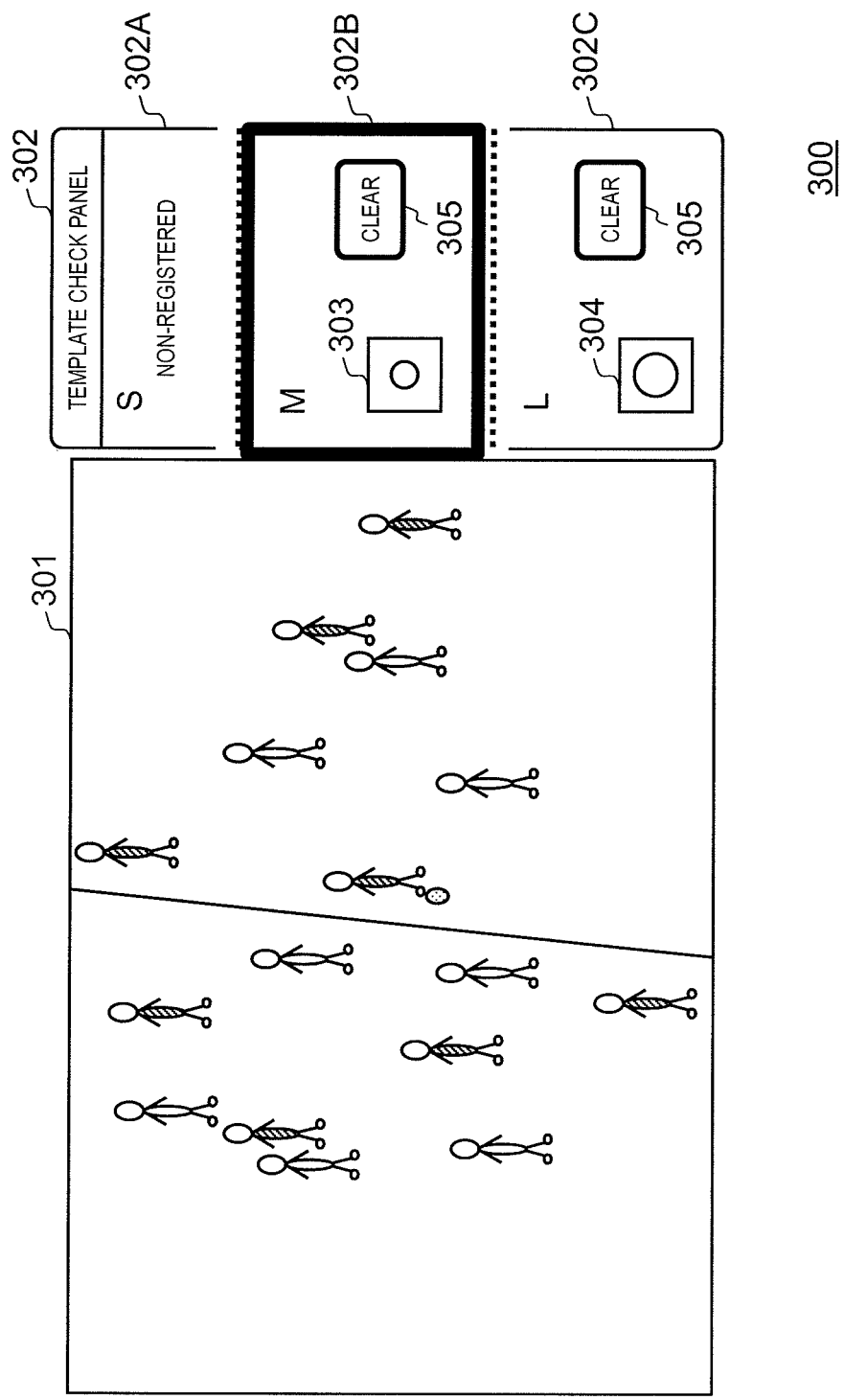
FIG. 14 is a diagram illustrating an example of a template image setting screen displayed on a display unit.

In Modification Example 2, processor 101 displays the template image used in generating the template on display unit 105 at any time. FIG. 14 is a diagram illustrating an example of template image setting screen 300 displayed on display unit 105.

As illustrated in FIG. 14, template image setting screen 300 includes field screen 301 and template check panel 302. Field screen 301 displays an image acquired from the external camera or the like, and it is possible for the user to check the position where the ball is currently positioned with reference to filed screen 301.

Template check panel 302 is a column in which the template image is displayed. Template check panel 302 includes panel 302A corresponding to the ball size group small, panel 302B corresponding to the ball size group medium, and panel 302C corresponding to the ball size group large.

In the example illustrated in FIG. 14, the template of a case of the ball size group small is not yet registered and is non-registered. Templates of cases of the ball size group medium and the ball size group large are registered, and the template images used in generating the templates are displayed in template image display columns 303 and 304.

Clear button 305 is displayed on panel 302B and panel 302C in which the template is registered among the columns respectively corresponding to the ball size groups of template check panel 302. Clear button 305 may be selected by an operation of the user via input unit 104. In a case in which clear button 305 is operated, processor 101 deletes the template image and the template feature amount corresponding to the ball size group of the panel where operated clear button 305 is present. Therefore, in a case in which a lost of tracking or an incorrect detection increases due to, for example, a change in a weather or lighting condition, in the tracking process or the detection process, it is possible for the user to delete the current template image and template feature amount, by operating clear button 305. In a case in which the current template image and template feature amount are deleted, processor 101 generates the template image and the template feature amount appropriate for the current weather or lighting condition.

As described above, in Modification Example 2, it is possible to display the template image on the display unit and enable the user to select the template image. Therefore, it is possible to generate the template image more appropriate for the weather or lighting condition of the stadium.

INDUSTRIAL APPLICABILITY

The present disclosure can be applied to a moving body tracking device that detects a moving body in a sports image obtained by capturing a sports game.

REFERENCE MARKS IN THE DRAWINGS

100 MOVING BODY TRACKING DEVICE
101 PROCESSOR
102 STORAGE UNIT
103 COMMUNICATION CIRCUIT
104 INPUT UNIT
105 DISPLAY UNIT
106 BUS
300 TEMPLATE IMAGE SETTING SCREEN
301 FIELD SCREEN
302 TEMPLATE CHECK PANEL
302A, 302B, 302C PANEL
303, 304 TEMPLATE IMAGE DISPLAY COLUMN
305 CLEAR BUTTON

The invention claimed is:

1. A moving body tracking method of tracking a position of a moving body in each of images of a plurality of frames configuring a sports image obtained by capturing a game of sports, by a processor, the method comprising:
    estimating a size of the moving body in each of the images of the frames;
    updating a template feature amount to a feature amount generated from a template image corresponding to the estimated size of the moving body, based on the estimated size of the moving body;
    comparing a feature amount of a candidate region that is a candidate of a region where the moving body is present in each of the images of the frames with the template feature amount corresponding to the estimated size of the moving body, and determining whether or not the moving body is positioned in the candidate region based on a comparison result, and
    changing the template feature amount used for the comparison according to a size group to which the estimated size of the moving body belongs, among a plurality of size groups.

2. The moving body tracking method of claim 1, wherein
    the comparison between the feature amount of the candidate region and the template feature amount is performed by calculating a distance between a color histogram of the candidate region and a color histogram of the template feature amount.

3. The moving body tracking method of claim 1, wherein
    the processor further updates a parameter including, at least, a predetermined threshold value for detecting the moving body, or a predetermined threshold value for tracking the moving body, based on the estimated size of the moving body.

4. The moving body tracking method of claim 1, further comprising:
    generating the template feature amount using an image in a vicinity of the moving body, in a case in which the estimated size of the moving body changes to another size group of the plurality of size groups.

5. The moving body tracking method of claim 1, further comprising:
    in a case in which a candidate region satisfying a condition is not present, scanning a rectangle region in an image of a frame by sequentially comparing the rectangle region with the template feature amount, and determining whether or not the moving body is present in the rectangle region based on the comparison result, and
    generating the template feature amount using an image in a vicinity of the rectangle region where it is determined that moving body is present.

6. The moving body tracking method of claim 1, wherein an initial value of the template feature amount is generated in advance before the game of the sports starts.

7. The moving body tracking method of claim 1, further comprising:
    generating a trajectory detection image based on the images of the plurality of frames, and
    detecting a trajectory of the moving body based on the trajectory detection image.

8. The moving body tracking method of claim 1, further comprising:
    displaying the template image on a display and performing a display for receiving an operation of deleting a predetermined template feature amount.

9. The moving body tracking method of claim 1, wherein the template feature amount used for the comparison is changed when the size group to which the estimated size of the moving body belongs changes.

10. The moving body tracking method of claim 1, wherein the plurality of size groups are stored in a storage such that each of the plurality of size groups is associated with a range of size and a template feature amount,
    the changing the template feature amount includes:
    selecting a size group of the plurality of size groups such that the estimated size of the moving body falls within the range of size associated with the selected size group;
    changing the template feature amount used for the comparison to the template feature amount associated with the selected size group.

11. A moving body tracking device for tracking a position of a moving body in each of images of a plurality of frames configuring a sports image obtained by capturing a game of sports, the moving body tracking device comprising:
    a memory that stores instructions; and
    a processor that, when executing the instructions stored in the memory, performs operations including:
    estimating a size of the moving body in each of the images of the frames;
    updating a template feature amount to a feature amount generated from a template image corresponding to the estimated size of the moving body, based on the estimated size of the moving body;
    comparing a feature amount of a candidate region that is a candidate of a region where the moving body is present in each of the images of the frames with the template feature amount corresponding to the estimated size of the moving body;
    determining whether or not the moving body is positioned in the candidate region based on a comparison result; and
    changing the template feature amount used for the comparison according to a size group to which the estimated size of the moving body belongs, among a plurality of size groups.

12. The moving body tracking device of claim 11, wherein
the comparison between the feature amount of the candidate region and the template feature amount is performed by calculating a distance between a color histogram of the candidate region and a color histogram of the template feature amount.

13. The moving body tracking device of claim 11, wherein the processor further updates a parameter including at least a predetermined threshold value for detecting the moving body, or a predetermined threshold value for tracking the moving body, based on the estimated size of the moving body.

14. The moving body tracking device of claim 11, wherein the processor generates the template feature amount using an image in a vicinity of the moving body in a case in which the estimated size of the moving body changes to another size group of the plurality of size groups.

15. The moving body tracking device of claim 11, wherein in a case in which a candidate region satisfying a condition is not present, the processor scans a rectangle region in an image of a frame by sequentially comparing the rectangle region with the template feature amount, determines whether or not the moving body is present in the rectangle region based on the comparison result, and generates the template feature amount using an image in a vicinity of the rectangle region where it is determined that moving body is present.

16. The moving body tracking device of claim 11, wherein an initial value of the template feature amount is generated in advance before the game of the sports starts.

17. The moving body tracking device of claim 11, wherein the processor further generates a trajectory detection image based on the images of the plurality of frames, and detects a trajectory of the moving body based on the trajectory detection image.

18. The moving body tracking device of claim 11, wherein the processor further displays the template image on a display and performs a display for receiving an operation of deleting a predetermined template feature amount.

19. A non-transitory storage medium that stores program which causes a processor to sequentially execute a process of tracking a position of a moving body in each of images of a plurality of frames configuring a sports image obtained by capturing a game of sports, the process comprising:
estimating a size of the moving body in each of the images of the frames;
updating a template feature amount to a feature amount generated from a template image corresponding to the estimated size of the moving body, based on the estimated size of the moving body;
comparing a feature amount of a candidate region that is a candidate of a region where the moving body is present in each of the images of the frames with the template feature amount corresponding to the estimated size of the moving body, and determining whether or not the moving body is positioned in the candidate region based on a comparison result, and
changing the template feature amount used for the comparison according to a size group to which the estimated size of the moving body belongs, among a plurality of size groups.

\* \* \* \* \*